(12) United States Patent
Beaver, IV

(10) Patent No.: US 11,919,488 B2
(45) Date of Patent: Mar. 5, 2024

(54) CAR DRYING LEAF BLOWER TUBE

(71) Applicant: David L. Beaver, IV, Westminster, CO (US)

(72) Inventor: David L. Beaver, IV, Westminster, CO (US)

(73) Assignee: ApexIP, LLC, Westminster, CO (US)

( * ) Notice: Subject to any disclaimer, the term of this patent is extended or adjusted under 35 U.S.C. 154(b) by 746 days.

(21) Appl. No.: 16/945,413

(22) Filed: Jul. 31, 2020

(65) Prior Publication Data
US 2021/0031731 A1 Feb. 4, 2021

Related U.S. Application Data

(60) Provisional application No. 62/881,072, filed on Jul. 31, 2019.

(51) Int. Cl.
*B60S 3/00* (2006.01)
*A01G 20/47* (2018.01)

(52) U.S. Cl.
CPC .............. *B60S 3/002* (2013.01); *A01G 20/47* (2018.02)

(58) Field of Classification Search
CPC ................................ A01G 20/47; B60S 3/002
USPC ............................................................ 34/666
See application file for complete search history.

(56) References Cited

U.S. PATENT DOCUMENTS

| | | | |
|---|---|---|---|
| 1,139,736 A | 5/1915 | Stabel | |
| D265,418 S * | 7/1982 | Chow | D23/262 |
| 4,884,314 A | 12/1989 | Miner et al. | |
| 5,216,822 A * | 6/1993 | Madiedo | F26B 21/003 34/97 |
| 5,584,436 A * | 12/1996 | Sepke | A47L 9/244 239/588 |
| 5,661,912 A * | 9/1997 | Bhatnagar | F26B 3/283 34/267 |

(Continued)

FOREIGN PATENT DOCUMENTS

| AT | 523379 A4 * | 8/2021 | ............ B60S 3/002 |
|---|---|---|---|
| WO | WO-2016134768 A1 * | 9/2016 | ............ B60S 3/002 |

OTHER PUBLICATIONS

ApexAire "Blower Tube Prototype V1.2," YouTube, Jan. 14, 2020, 7 pages [retrieved online from: https://www.youtube.com/watch?v=z61Cv72KEIY&feature=youtu.be].

(Continued)

*Primary Examiner* — Stephen M Gravini
(74) *Attorney, Agent, or Firm* — Sheridan Ross P.C.

(57) ABSTRACT

An attachment assembly to convert an existing leaf blower into a device for drying vehicles. The attachment assembly includes several interchangeable modular sections, including an adapter section configured to attach to the air outlet of an existing commercial leaf blower. Other sections include air outlet nozzle sections, an extender section, and a weighted section. The inlet side of the nozzle sections, extender section, and weighted section as well as the outlet sides of the adapter section, extender section, and weighted section are uniform so that any of the outlets may be mated with any of the inlets. This allows any configuration of sections desired to be achieved. The adapter section may have a filter placed in the air stream to prevent debris from being blown into the vehicle and damaging the exterior of the vehicle.

20 Claims, 21 Drawing Sheets

(56) References Cited

U.S. PATENT DOCUMENTS

| | | | | |
|---|---|---|---|---|
| 5,926,972 | A * | 7/1999 | Di Peso | A01K 13/001 34/128 |
| 6,195,907 | B1 * | 3/2001 | Bodnar | F04D 29/601 15/345 |
| 6,530,115 | B2 * | 3/2003 | MacNeil | B60S 3/002 15/316.1 |
| 8,465,597 | B2 * | 6/2013 | Turner | A47L 7/0028 15/328 |
| 8,752,241 | B2 | 6/2014 | Woerwag | |
| 9,131,643 | B2 | 9/2015 | Hoffman et al. | |
| 9,332,694 | B2 | 5/2016 | Prager | |
| 10,315,627 | B2 | 6/2019 | Chambers et al. | |
| 10,660,487 | B1 * | 5/2020 | Borja | A45D 20/16 |
| 11,634,107 | B2 * | 4/2023 | Smith | B60S 3/002 34/666 |
| 2018/0146628 | A1 | 5/2018 | Huo et al. | |
| 2021/0031731 | A1 * | 2/2021 | Beaver, IV | B60S 3/002 |

OTHER PUBLICATIONS

Obsessed Garage "Which EGO Leaf Blower for Drying Car?" YouTube, Jul. 13, 2019, 90 pages [retrieved online from: https://www.youtube.com/watch?v=DOVslsth8XM].

"Adam's Sidekick Blaster makes a great gift!," Uploaded to Instagram by Adam's Polishes, Dec. 7, 2018, retrieved from https://www.instagram.com/p/BrGEjPWItZC/, 1 page.

"Bigboi's got you covered. From entry level cars to the most desirable cars in the world," Uploaded to Instagram by BigBoi Car Care, Jul. 26, 2019, retrieved from https://www.instagram.com/p/B0YU1OOhzk5/, 1 page.

"Leaf Blower Drying Method | Safe and Effective," Uploaded to YouTube by Obsessed Garage, Aug. 23, 2015, retrieved from https://www.youtube.com/watch?v=nirkRQZvpa0, 4 pages.

"Metrovac Home Page," Metrovac, publication date unknown, archived webpage dated Jul. 3, 2019, retrieved from https://web.archive.org/web/20190703095537/https://metrovac.com/, 5 pages.

"Mosmatic Dryer," Mosmatic Professional Dealer, publication date unknown, archived webpage dated Dec. 22, 2018, retrieved from https://web.archive.org/web/20181222123239/https:/mosmaticpro.com/collections/mosmatic-dryer, 9 pages.

"RYOBI Home Page," RYOBI Limited, publication date unknown, archived webpage dated Jul. 20, 2019, retrieved from https://web.archive.org/web/20190720103644/https:/www.ryobitools.com/, 3 pages.

"The clock is ticking! Need it in time for Father's Day?" Uploaded to Instagram by Adam's Polishes, Jun. 7, 2019, retrieved from https://www.instagram.com/p/BybSkJOIkk5/, 2 pages.

"EGO Power+ Home Page," EGO Power+, publication date unknown, archived webpage dated Jun. 12, 2019, retrieved from https://web.archive.org/web/20190612043745/https:/egopowerplus.com/, 5 pages.

* cited by examiner

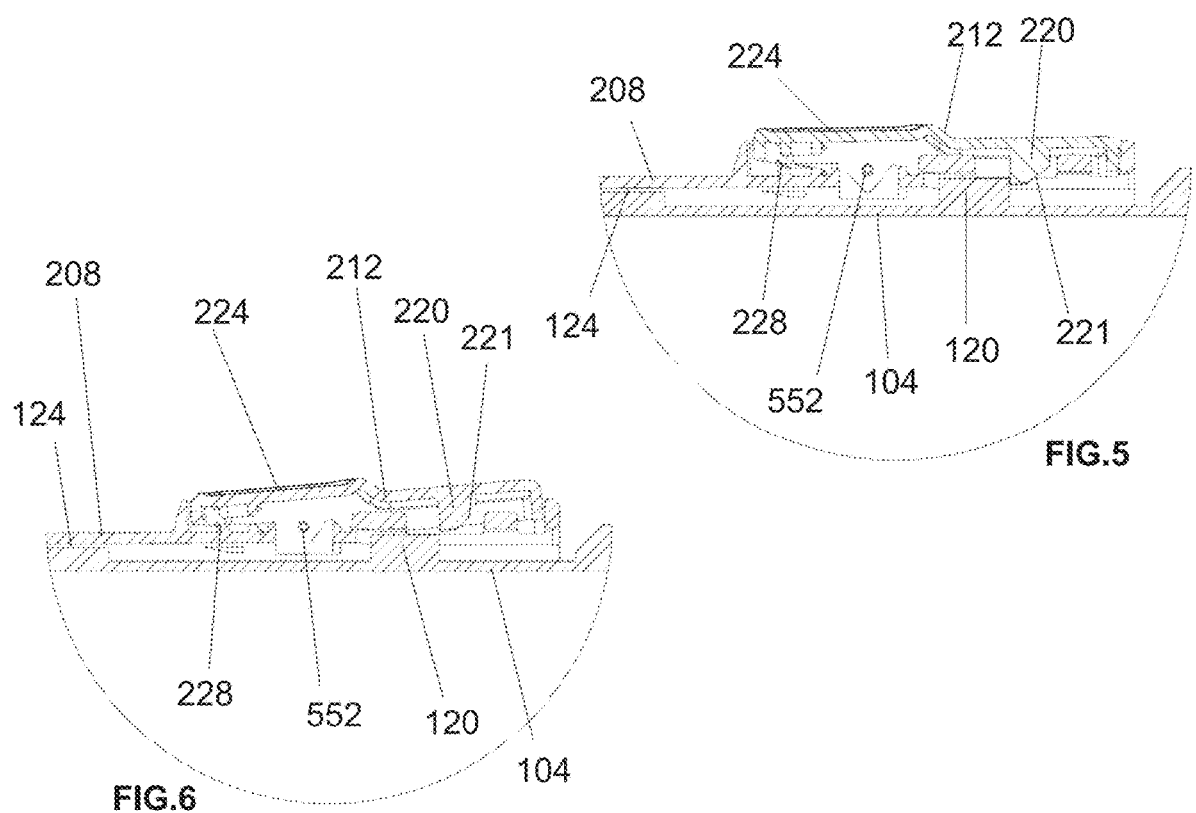

CAR DRYING LEAF BLOWER TUBE

CROSS-REFERENCE TO RELATED APPLICATIONS

This application claims the benefit of U.S. Provisional Application No. 62/881,072 filed on Jul. 31, 2019, entitled "CAR DRYING LEAF BLOWER TUBE" which application is incorporated herein by reference in its entirety.

FIELD OF THE INVENTION

Embodiments of the present invention generally relate to drying a vehicle, and more specifically to drying a vehicle using a handheld blower.

BACKGROUND OF THE INVENTION

Handheld blowers used for yard and other outdoor work are common. Invented in the late 1950's, they have gained popularity and versatility overtime. Originally, blowers were used to spray chemicals in the agricultural industry and now have many uses, from blowing leaves into piles, to cleaning gutters and surfaces of debris. They are versatile instruments and readily available at most hardware, lawn and garden, and big box stores. Additionally, with the introduction of battery powered lawn care tools, the restrictions of a power cord are eliminated and blowers may now be used in more places and for more end uses.

With over 250 million motor vehicles, the United States has one of the world's highest vehicle-per-capita rates with almost 1 vehicle for every person in the country. In order to maintain proper care of their vehicles, vehicle owners must wash and clean the exterior of the vehicles to prevent rust and deterioration of the paint from salt and other damaging materials. Maintaining a clean vehicle also prevents the user from becoming dirty when entering and exiting the vehicle. Further, many users take pride in keeping their vehicle clean and aesthetically pleasing. For these purposes, it is important to dry the vehicle after washing to remove residual dirt and chemicals and prevent the formation of water marks on the vehicle surface. Drying the vehicle involves either significant manual labor by the owner using towels or chammies or paying for an automated car wash that utilizes large industrial blowers for blow drying the vehicle or manual laborers to hand dry the vehicle. Towel drying a vehicle is tedious and may be difficult depending upon the size of the vehicle and the owner. Moreover, drying a car with a cloth can cause micro scratches on the vehicle's paint. Automated car washes with industrial drying blowers, while involving little to no labor, use high power water jets, large contact roller brushes or pads which may also cause damage to the vehicle's exterior. Automated car washes also cost money to use. Thus, car owners have long faced the dilemma of choosing between allowing water spots to form on the car, manually drying their vehicles themselves with towels, paying for an automated car wash with drying, or paying others to manually dry the vehicle.

There has thus been a long felt need for a vehicle dryer that is inexpensive, readily accessible and does not cause damage to the vehicle's exterior. With the amount of vehicles in the United States and worldwide, there is a large market for a device that it inexpensive and can quickly dry a vehicle with minimal user effort without damaging the vehicle's exterior surface. Despite the large need and demand, and given the widespread availability of lawn and/or debris blowers for decades, there has been a surprising failure to successfully develop a vehicle drying blower using a lawn blower.

SUMMARY OF THE INVENTION

The present disclosure inexpensively solves the problem of drying vehicles without damaging the paint by providing a drying attachment for use with handheld yard blowers. According to aspects of the present disclosure, in one embodiment the attachment includes an adapter configured to attach to a pre-existing yard blower and a nozzle configured to connect to the adapter. The adapter has a first end that is configured to attach to a pre-existing blower's outlet and a second, opposite end that is designed to connect to a nozzle or, in other embodiments, a plurality of other component pieces. The remaining component sections comprise a variety of extenders, other nozzles, and a weighted section to assist a user in counterbalancing the weight of the blower.

Existing commercial blowers typically have a removable blower tube which is connected to a fixed or non-removable air outlet port of the blower by some sort of attachment feature. According to aspects of the present disclosure, a variety of multiple adapters are available wherein the first end is specially configured to interconnect with the particular outlet port of different blower brands, e.g., Black & Decker, DeWalt, Ryobi, EGo, Husqvarna, Toro, Snapper, Echo, and Milwaukee, among others, while the second, opposite outlet end of these various adapters will be identical in order to interconnect with the various nozzles and other components comprising the different embodiments of a drying adapter assembly. The attachment feature may be a raised edge, a recessed groove, a notch, a locking element, or similar associated with the non-removable outlet port. The adapter is configured to engage this attachment feature at the adapter section inlet and provide a new downstream outlet for the air expelled from the blower. As noted, in preferred embodiments, the adapter outlet has a common size to mate with all other downstream sections, which are discussed below, thus reducing manufacturing costs and increasing the configurations available to the end user.

In at least one embodiment, the adapter section includes an in-line filter. The filter may be disposed at the adapter section outlet, or anywhere along the body of the adapter while in the airflow path. The filter may comprise a mesh which allows air to flow through the device but prevents the expulsion of small debris that could scratch or mar the surface of the vehicle. The mesh would be sized to prevent the passage of debris without restricting airflow significantly. The filter may also be removable and include different sized configurations that prevent the expulsion of different sized debris ranging from small particles such as pieces of leaves and other debris, to larger debris such as sticks and pine needles.

In one embodiment, a conical nozzle is connected to the outlet of the adapter section. The conical nozzle attaches to the outlet of the adapter section via a number of attachment clips. A clip may be on either the adapter section, the nozzle section, or both and is configured to engage a clip receiving feature associated with the opposite component section. The clip receiving feature may include a raised edge, a recessed groove, a notch, a locking element or some other structure known to those of skill in the art and used to secure one component in a mating position with a second component.

Another embodiment comprises the adapter section with a selectively articulating nozzle. The articulating nozzle pivots in at least one direction and may also rotate. The articulating nozzle may be composed of two separate sections, an inlet section configured to mate with the outlet end of the adapter or the outlet end of an extender tube (discussed herein), and an outlet section. The inlet section is generally tubular and in at least one embodiment has a first or inlet end that fits over the outlet end of an adapter or extender tube, and a second end, opposite the first end, having a partial spherical outer surface having a slot shaped aperture to allow air to pass through the inlet section and into the outlet section. According to aspects of the present disclosure, the inlet section is capable of rotating three-hundred sixty degrees in either direction relative to the adapter or extender tube.

The outlet section of the articulating nozzle has a first, upstream end with a partial spherical surface which engages and covers the partial spherical end of the inlet section when the two sections are joined. A pair of pins, rivets or screws connect the outlet section to the inlet section wherein the partial spherical section of the inlet section and the partial spherical cover section of the outlet section mate or nest and the outlet section is free to pivot about the pins and redirect airflow as a result. The outlet section has a wedge-shaped pivoting nozzle section extending from the partial spherical cover portion and optionally ends in a rubber safety tip. This configuration allows the air flow to be directed up to 45 degrees off the longitudinal axis of the airflow. The articulating nozzle section may be attached by clips located on the nozzle section, the adapter section, or both which engage a clip attachment feature of the opposite section. The clip attachment feature may be a raised edge or a recessed groove. The articulating nozzle may be able to rotate around the adapter section, allowing two degrees of motion.

In another embodiment, an extender section connects the adapter section with either of the nozzle sections. The extender is a hollow tube having a certain length and is intended to extend the location of the air outlet from the blower in order for a user to reach and dry farther away portions of the vehicle. Multiple extender sections may be joined to extend the nozzle farther, for example, when drying larger vehicles such as campers and RVs. The extender has an inlet side that is configured to be connected to the adapter section by clips which engage a clip attachment feature on the corresponding section. The clips may be on the adapter section, the extender section, or both. The clip attachment feature may be a raised edge or a recessed groove. The outlet section of the extender section may be the same size as the outlet of the adapter section and therefore, be able to receive any of the other sections, except for the adapter section, discussed herein. The outlet section of the extender may have clips for attaching an additional section, or a clip attachment feature, or both.

In another embodiment, a weighted section may be joined with the other components to provide a counterbalance to the weight of the blower body and facilitate use of the blower as a vehicle dryer. The weighted section may be positioned between the adapter section and a nozzle section. The weighted section is configured to be connected to the adapter section by clips. The clips may be on either the weighted section, the adapter section, or both, and engage a clip receiving feature. The clip receiving feature may be a raised edge or a recessed groove. The weighted section may have a weighted collar between the weighted section inlet and the weighted section outlet. The weighted collar may be weighted by sand, metal, plastic, water, or other suitable dense material. The outlet of the weighted section may connect to an additional section by clips on either the weighted section, nozzle section, or both, which engage a clip attachment feature. The clip attachment feature may be on either the weighted section, the downstream section, or both, and is configured to engage a clip attachment feature. The clip attachment feature may be a raised edge or a recessed groove and may be on the weighted section, the nozzle section, or both.

Another embodiment of the invention comprises a safety tip for the nozzle sections. The safety tip is located on the outer edge or outlet end of the nozzle where the air flow is expelled from the device. The safety tip may be over-molded or attached by a friction fit or adhesive. The safety tip is composed of a soft material which may be rubber or some other soft polymer. The safety tip prevents the configured blower attachment from denting or scratching the surface of a vehicle upon contact.

DESCRIPTION OF FIGURES

FIG. 5 is a close-up view of an adapter attachment clip in an engaged position.

FIG. 6 is a close-up view of an adapter attachment clip in a disengaged position.

DETAILED DESCRIPTION OF DRAWINGS

Component List

Figure 1:
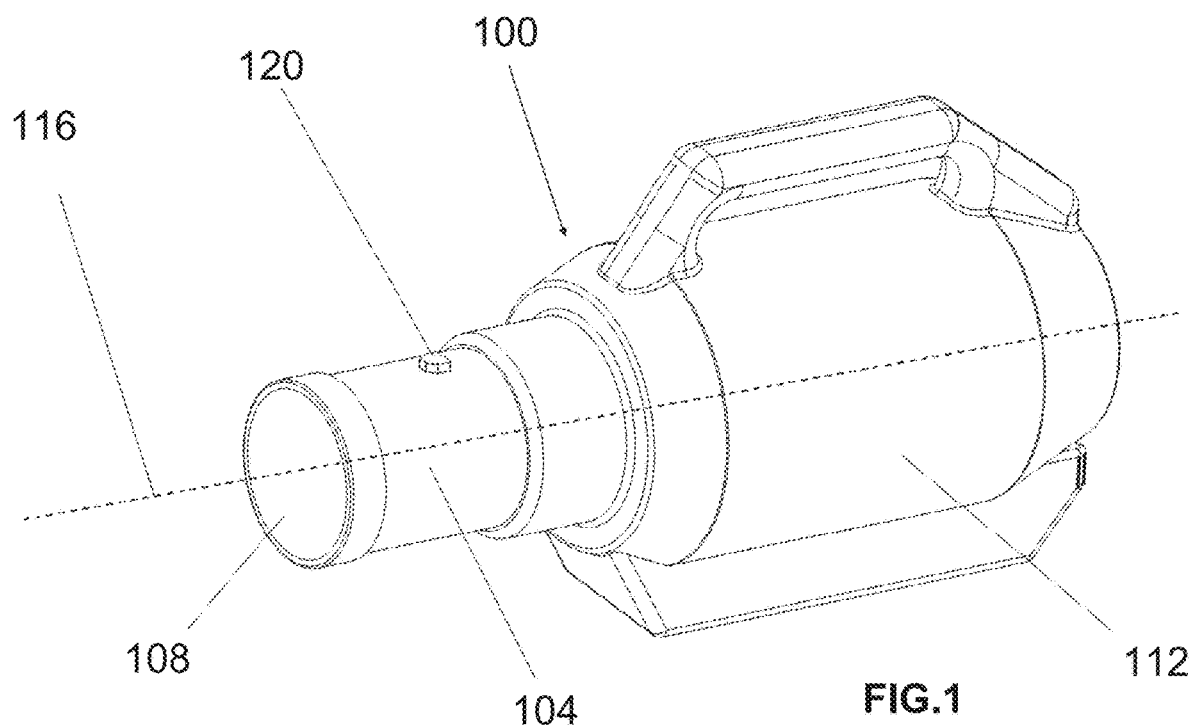
FIG. 1 is a perspective view of one embodiment of a blower body.

Blower 100
Blower Outlet Tube 104
Blower Outlet 108
Blower Body 112
Blower axis 116
Attachment Feature 120
Overlapping Portion 124
Adapter Section 200
Adapter body 208
Adapter Clip Body 212
Adapter Attachment Clip 216
Adapter Clip Tooth 220
Tooth Leading Edge 221
Adapter Clip Release Button 224
Adapter Clip Spring 228
Adapter Connection Collar 232
Clip Attachment Feature 236
Adapter Outlet 240
Adapter Inlet 244
Filter 300
Weighted Section 400
Weighted body 404
Weighted Ring 408
Weighted Section Inlet 412
Weighted Section Outlet 413
Ring exterior 416
Conical Nozzle 500
Conical nozzle body 504
Conical nozzle inlet 508
Conical nozzle outlet 512
Safety Tip 516
Nozzle attachment clip 528
Clip release button 532
Nozzle Connection collar 536
Clip tooth 544
Clip spring 548
Clip pin 552
Extender Section 600
Extender tube 604
Extender inlet 608
Articulating Nozzle 700
Pin 704
Pin holes 708
Partially spherical outer surface 712
Partially spherical inlet section 716
Rotatable body 720
Pivoting nozzle section 724
Nozzle body outlet 728
Opening 732
Tapered body 736
Articulating nozzle outlet 740
Articulating nozzle inlet 744

FIG. 1 is a perspective view of a generic blower (100). The blower has a blower body (112). The blower body has a blower outlet tube (104) extending from the blower body (112). The blower outlet tube (104) has at least one attachment feature (120) situated between the blower body (112) and the blower outlet (108). This attachment feature (120) is used to engage and secure attachments that are sold commercially with blowers such as an extension tube. It is shown here as a raised hexagonal shape but could also include other geometric shapes known to those of skill in the art. The blower outlet tube (104) defines an axis (116) coextensive with the direction of air flow out of the blower outlet tube (104).

FIGS. 2-8 are elevation views showing the blower (100) and one embodiment of a dryer kit or assembly that can be attached to a commercial blower. The assembly as illustrated includes an adapter section (200) and a conical nozzle (500). The adapter section (200) further includes an adapter attachment clip (216) configured to engage the attachment feature (120) of the blower outlet tube (104). The adapter section (200) is configured to be attached to the blower outlet tube (104) in an overlapping manner. Portion (124) overlaps the blower tube by a sufficient distance to provide stability. The overlap is between 0.5 and 8 inches, preferably between 1 and 6 inches, and most preferably 3 and 5 inches. While the illustrated configuration shows the adapter positioned outside of the blower outlet tube, the orientation may be reversed where the adapter fits inside the existing blower outlet tube (104). The adapter attachment clip (216) has an adapter clip release button (224) that when depressed disengages the adapter attachment clip (216) from the attachment feature (120) and allows the user to remove or disassemble the adapter section (200) from the blower outlet tube (104).

Figure 2:
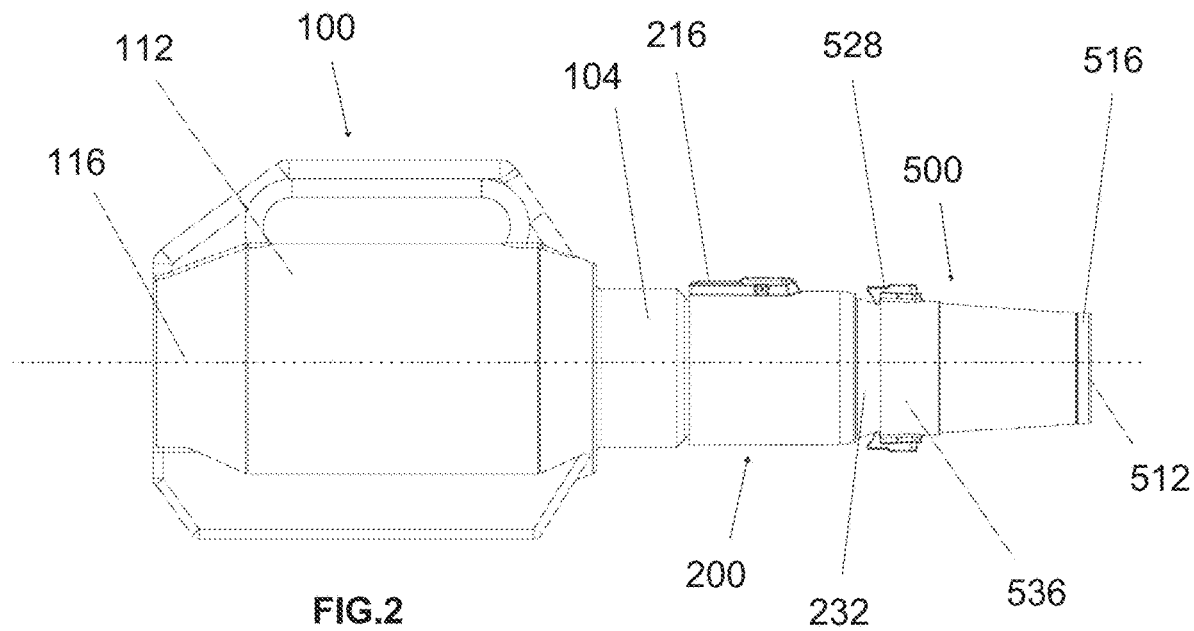
FIG. 2 is an elevation view of the blower body with one embodiment of a drying assembly having an adapter section and conical nozzle.
Figure 4:
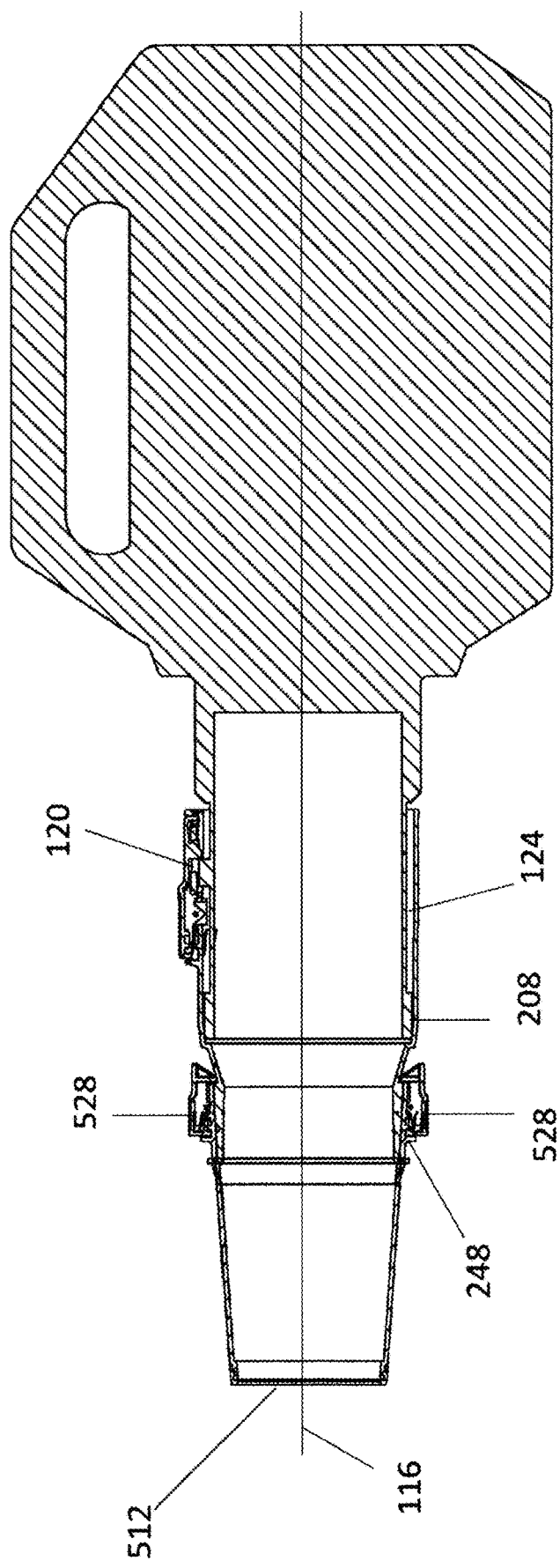
FIG. 4 is a cross sectional view of the adapter section and conical nozzle of FIG. 2 attached to a blower body.
Figure 7:
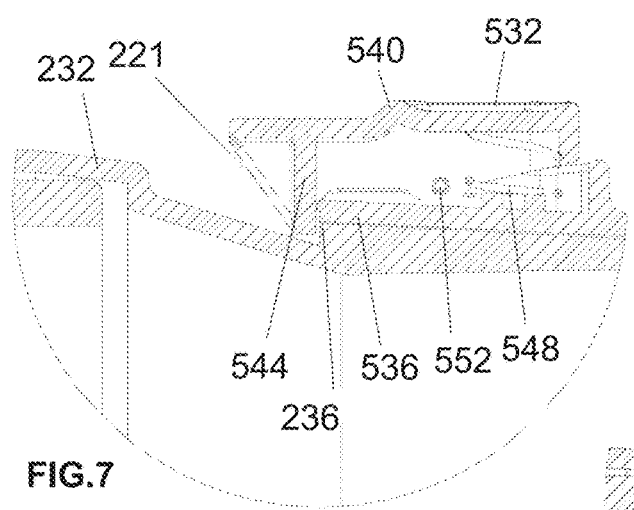
FIG. 7 is a close-up view of a nozzle attachment clip in an engaged position.
Figure 8:
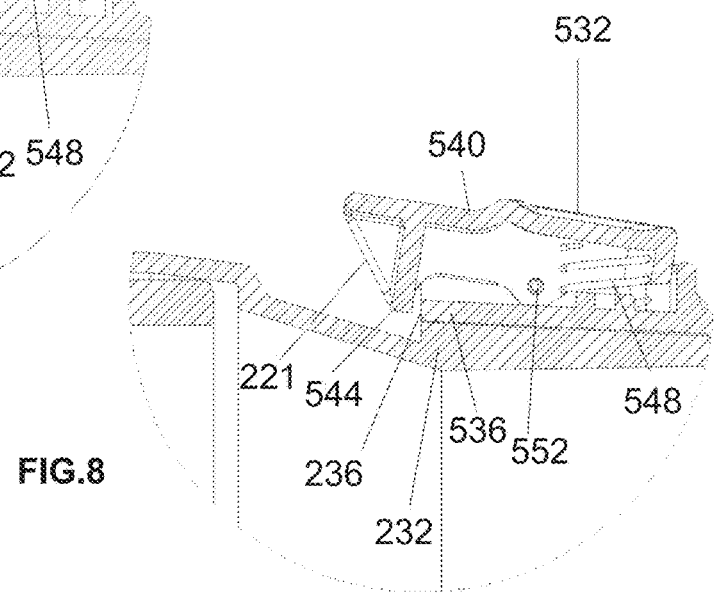
FIG. 8 is a close-up view of a nozzle attachment clip in a disengaged position.
Figure 9:
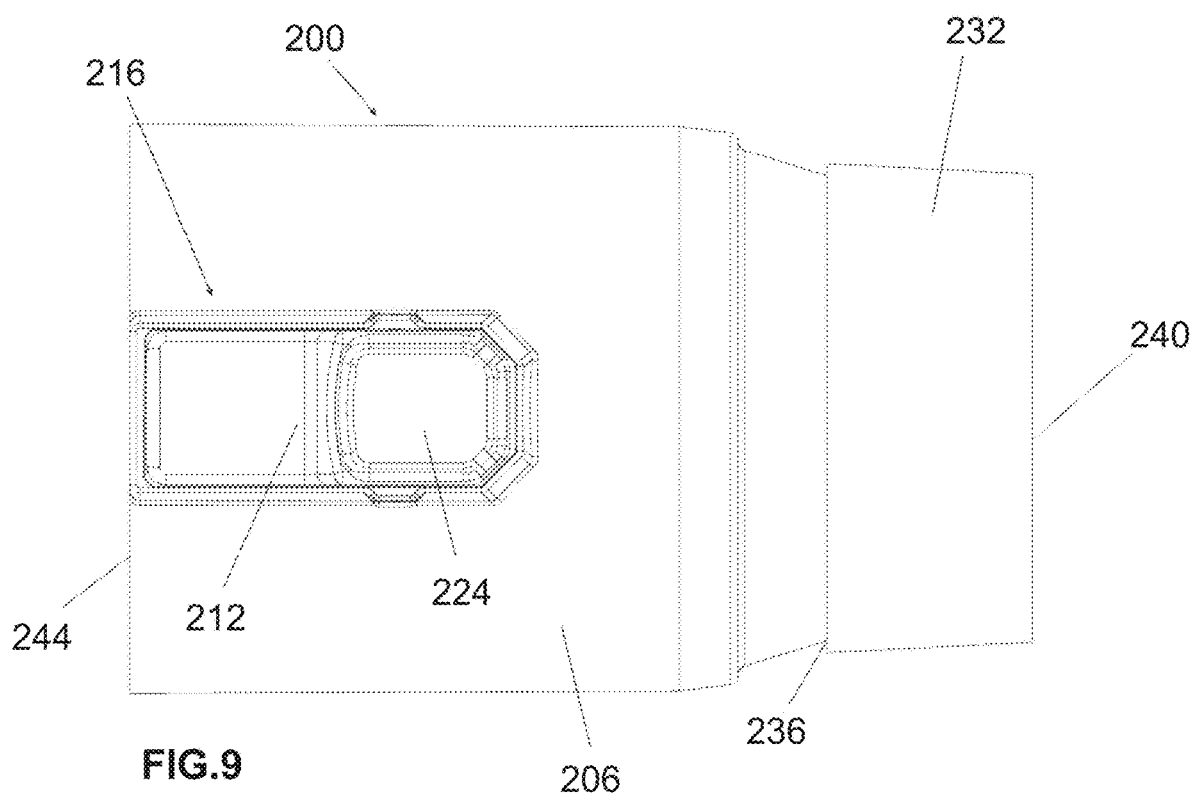
FIG. 9 is a top plan view of the adapter section of FIG. 2.

The adapter section (200), as shown in FIGS. 2, 4, and 9 is tubular to allow airflow from the blower outlet tube (104) to travel from the adapter inlet (244) through the adapter section (200) to the adapter outlet (240) and into the conical nozzle inlet (508) of the conical nozzle (500). The adapter section (200) has an adapter (208) and an adapter connection collar (232). The adapter connection collar (232) is located at the outlet end of the adapter (208). The adapter connection collar has a clip attachment feature (236). This clip attachment feature (236) may be a shoulder formed by a raised edge or a recessed groove. The adapter connection collar (232) is designed to overlap with the nozzle connection collar (536) of the conical nozzle (500). This overlap is between 0.5 and 3 inches, preferably between 1 and 2.5 inches, and most preferably between 1.5 and 2 inches. The end of the adapter connection collar (232) is the adapter outlet (240).

The adapter attachment clip (216) has an adapter clip spring (228), an adapter clip tooth (220), an adapter clip body (212), a clip pin (552), and an adapter clip release button (224). The adapter clip release button (224) is positioned over the adapter clip spring (228) so that the spring provides a force radially outwards from the adapter tube. The clip body connects the adapter clip release button to the adapter clip tooth (220). The clip pin (552) is between the clip release button and the adapter clip tooth and provides a fulcrum for the adapter clip body (212). The adapter attachment clip (216) is designed to engage a raised geometric shape (120) on the blower outlet tube (104). The adapter attachment clip (216) is self-locking so that it automatically engages the attachment feature (120) when the adapter (200) is placed on the blower outlet tube (104) without the need to depress the clip release button (532). However, the attachment clip (528) may not be removed unless the clip release button (532) is depressed. The adapter clip spring (228) provides a biasing force against the underside of the adapter clip release button (224) which forces the adapter clip tooth (220) down. As the adapter section (200) is slid over the blower outlet tube (104), the adapter clip tooth (220) has an angled leading edge (221) that forces the adapter clip tooth (220) to raise over the attachment feature (120). When the adapter clip tooth (220) passes the attachment feature (120), the force from the adapter clip spring (228) pushes the adapter clip release button (224) up and the adapter clip tooth (220) down which creates a secure engagement and prevents the adapter section (200) from being removed from the blower outlet tube (104) unless the adapter clip tooth (220) is raised by depressing the adapter clip release button (224).

Figure 10:
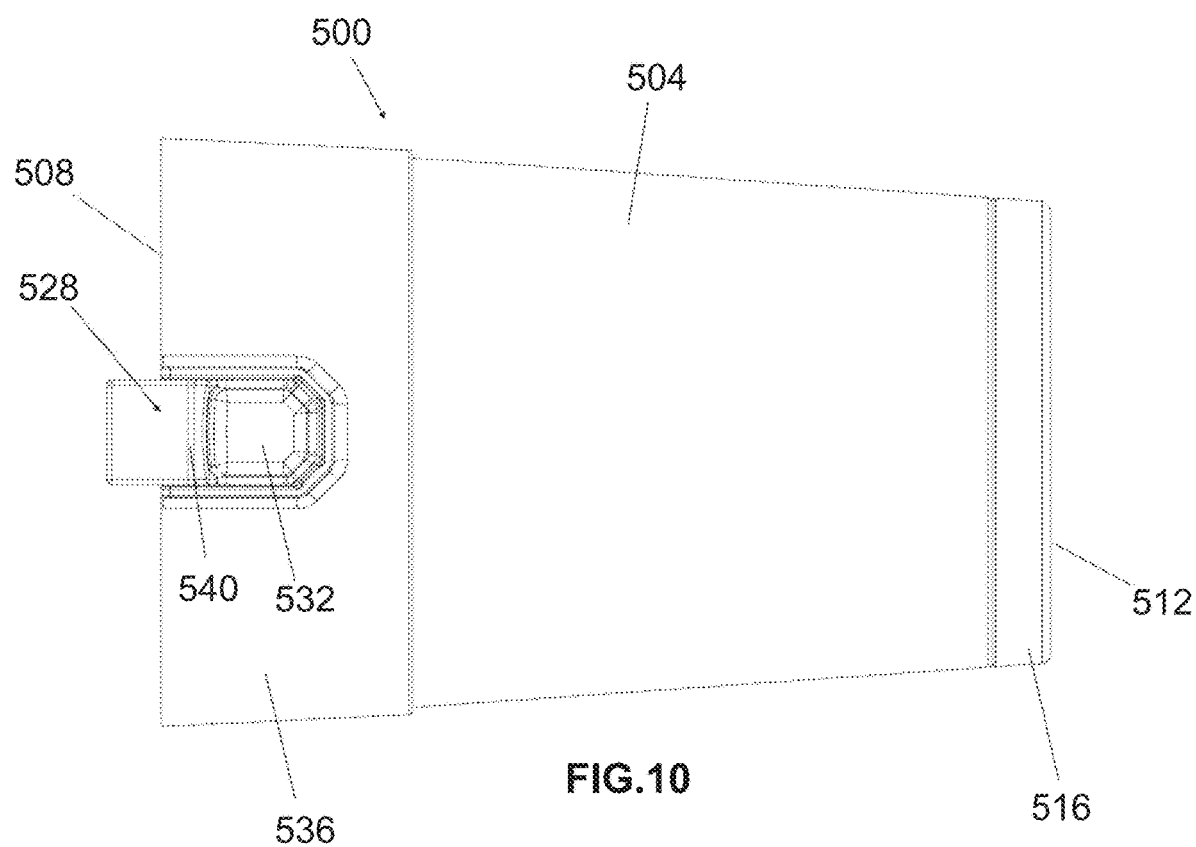
FIG. 10 is a top plan view of the conical nozzle of FIG. 2.
Figure 11:
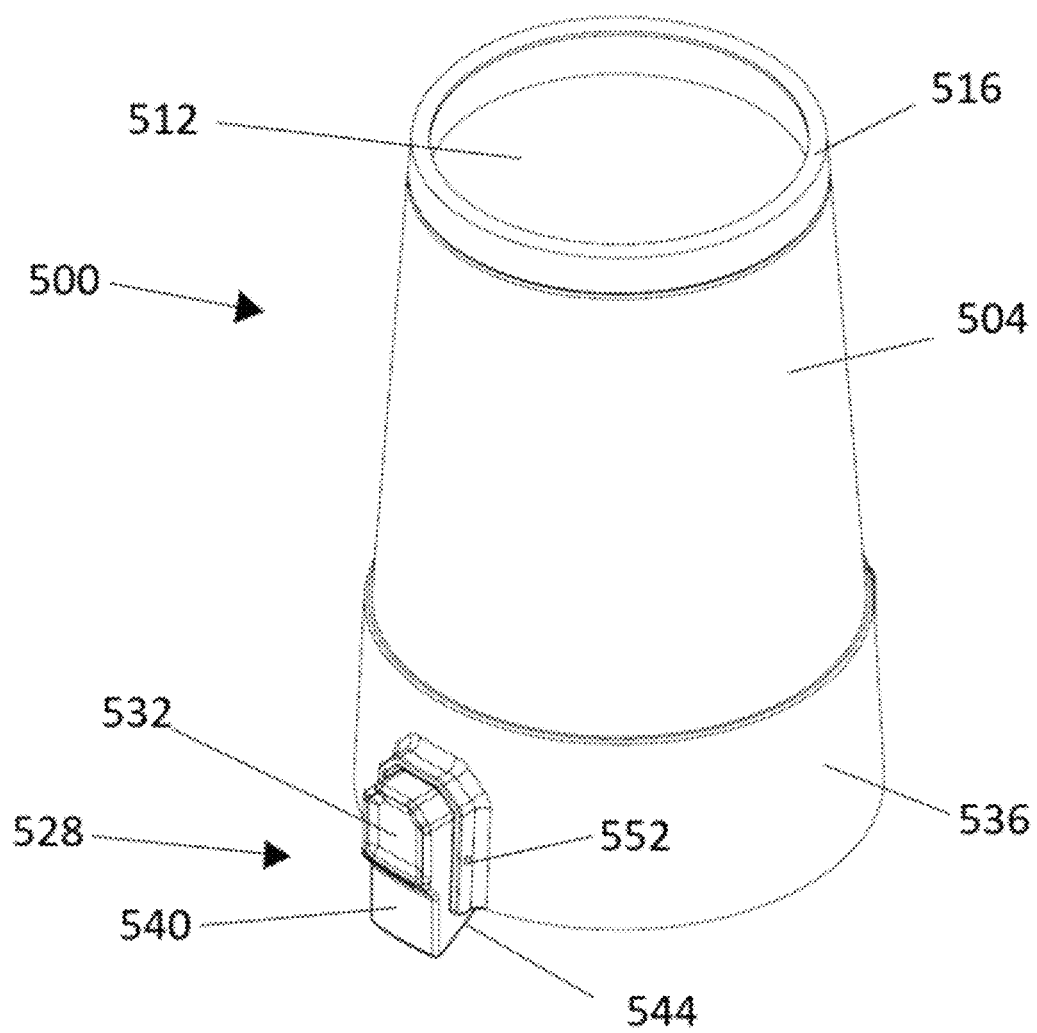
FIG. 11 is a perspective view of the conical nozzle of FIG. 2.
Figure 12:
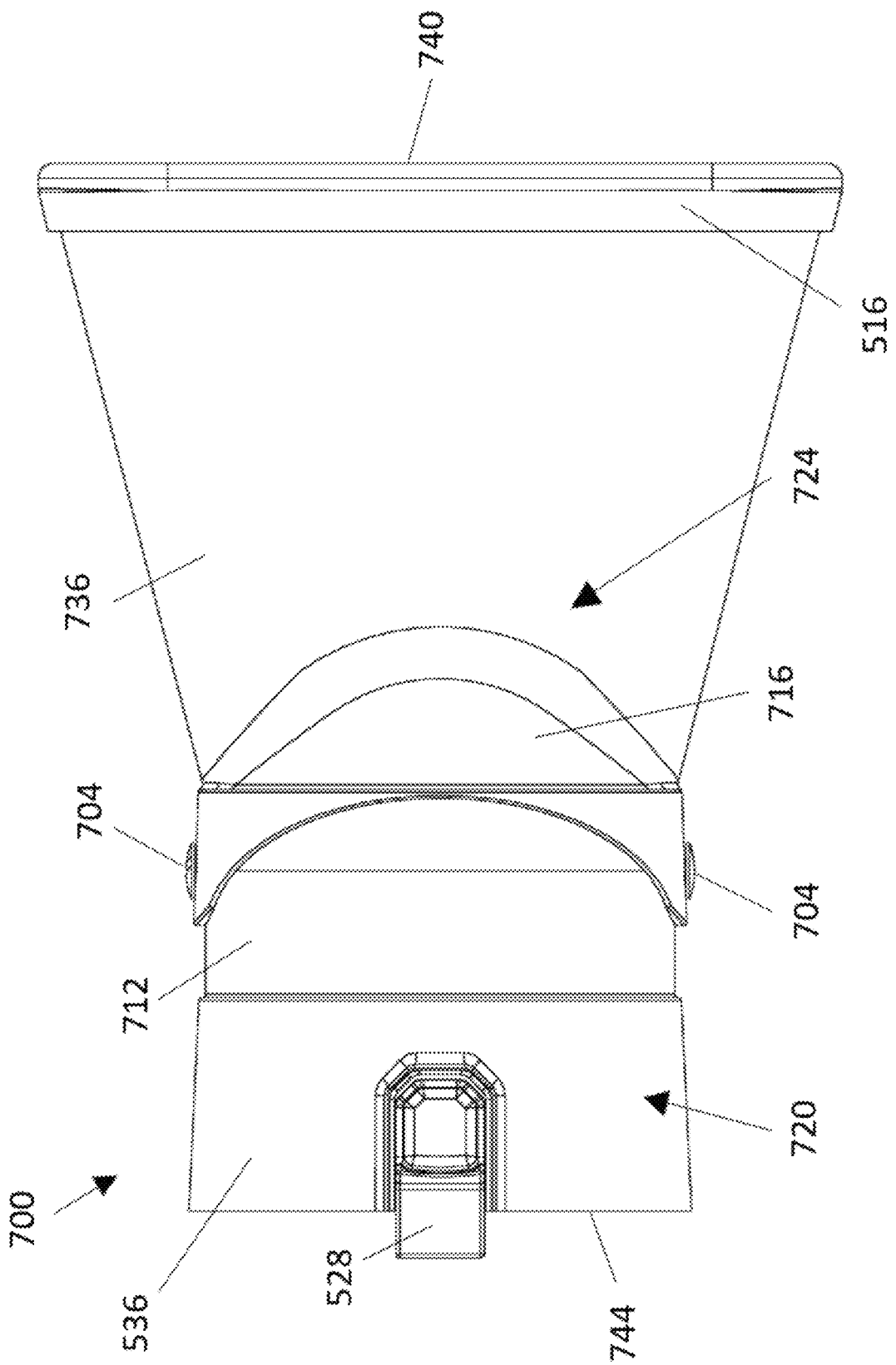
FIG. 12 is a top plan view of one embodiment of an articulating nozzle.
Figure 13:
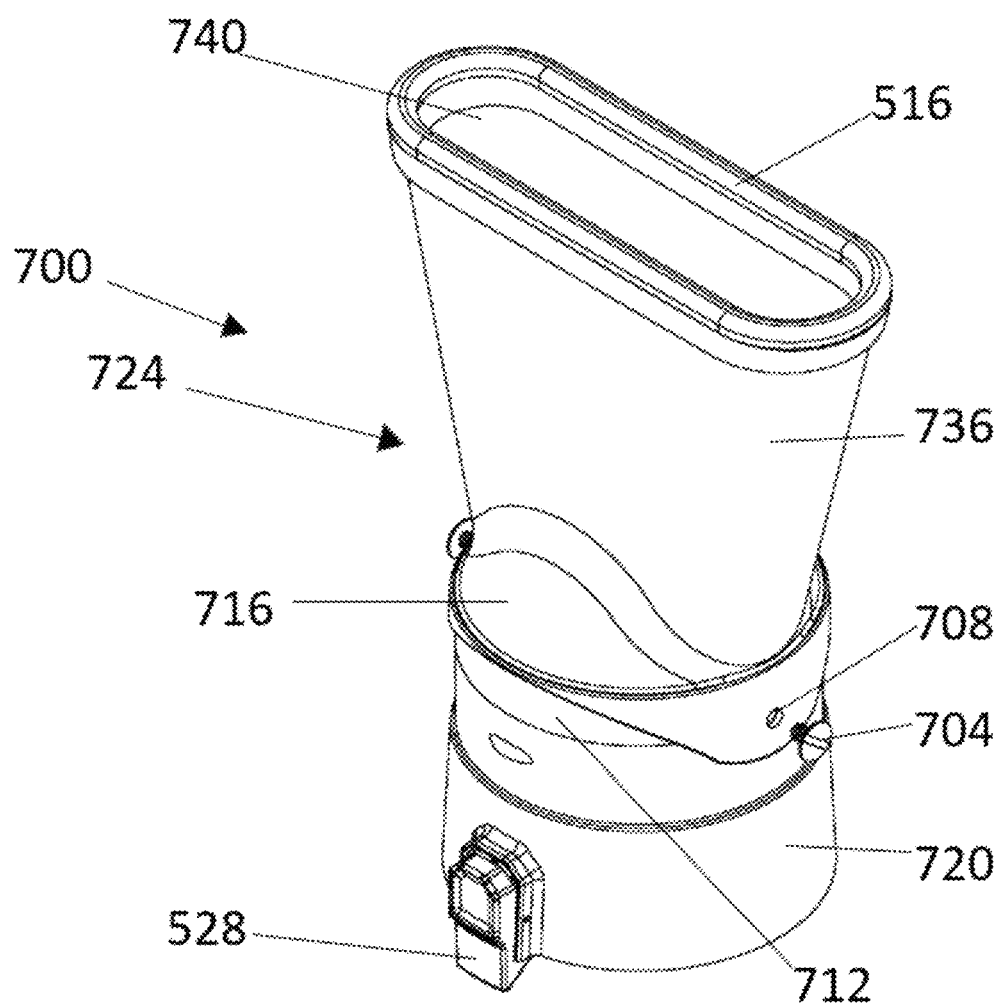
FIG. 13 is a perspective view of the articulating nozzle of FIG. 12.
Figure 14:
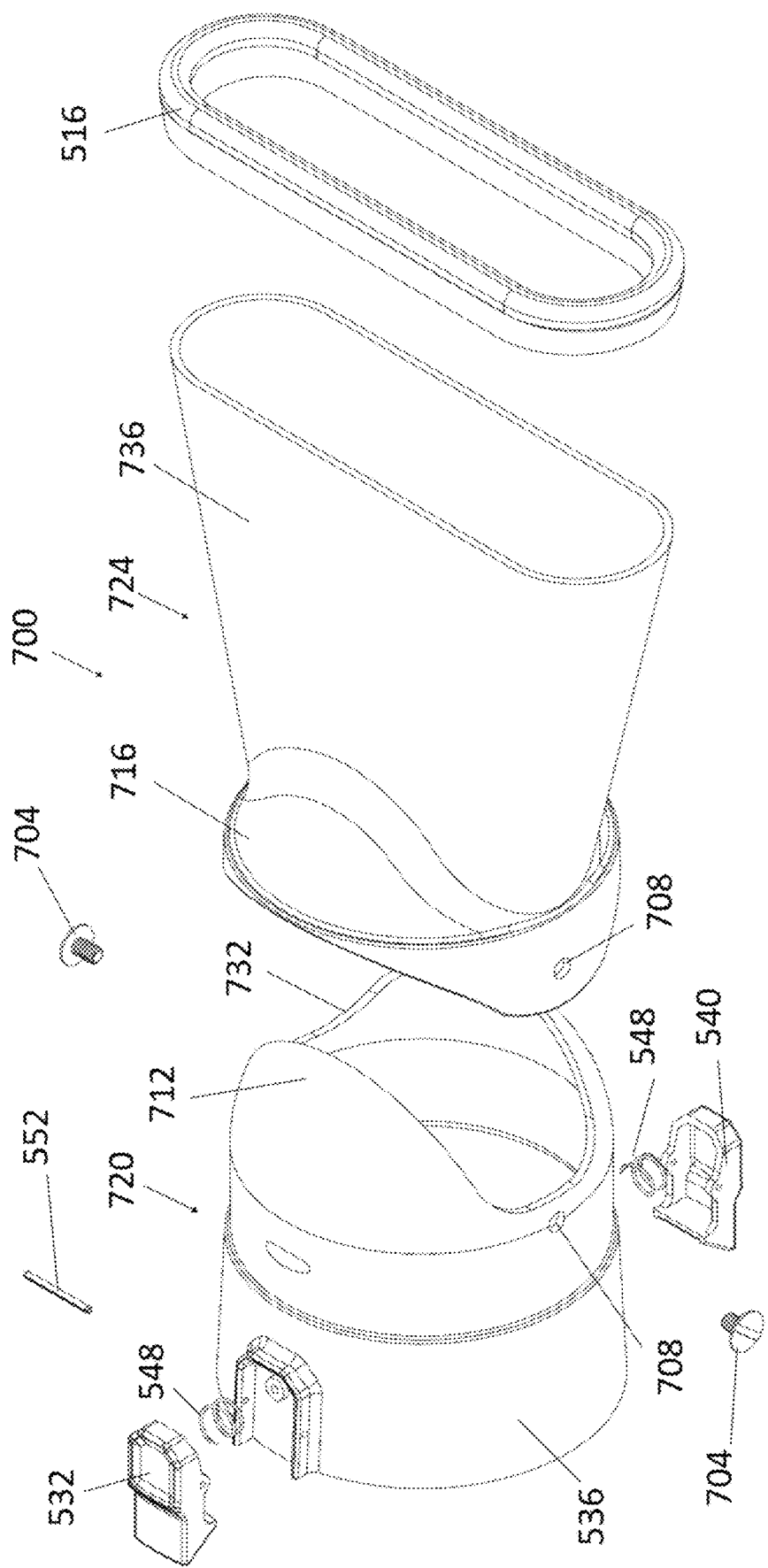
FIG. 14 is a first exploded perspective view of the articulating nozzle of FIG. 12.
Figure 15:
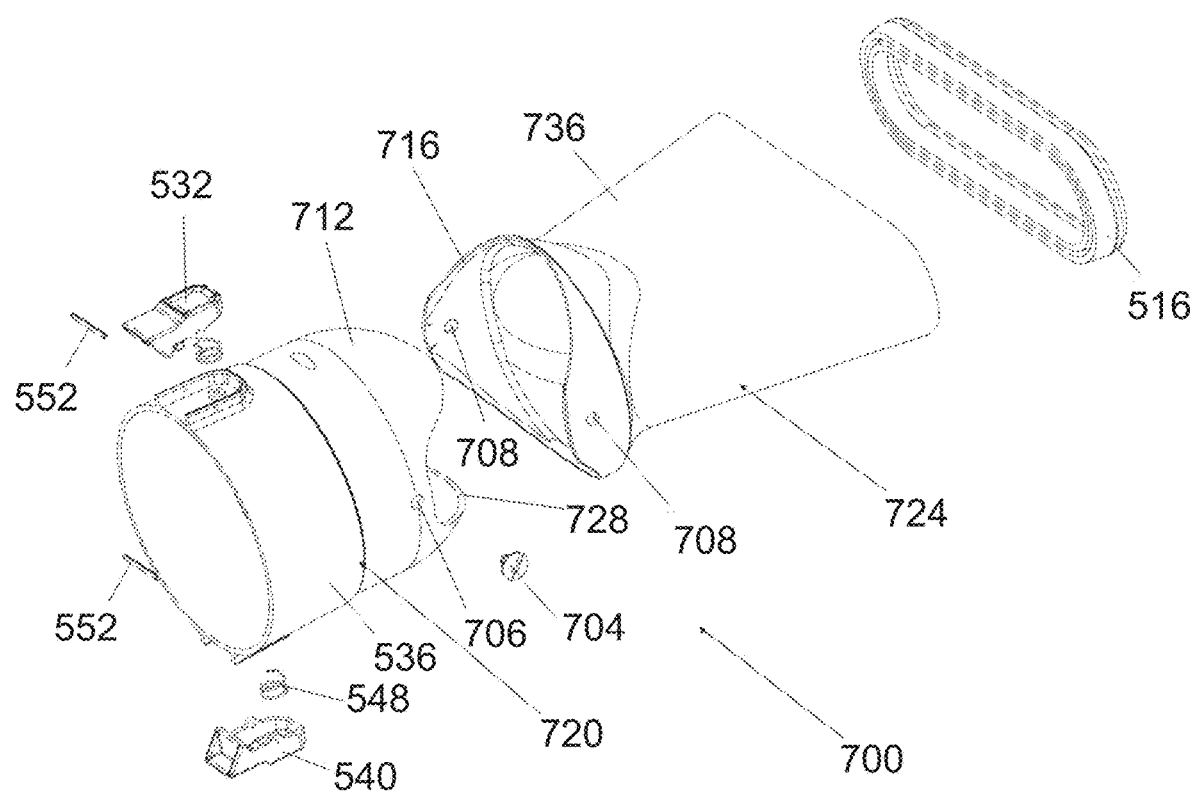
FIG. 15 is a second exploded perspective view of the articulating nozzle of FIG. 12.
Figure 16:
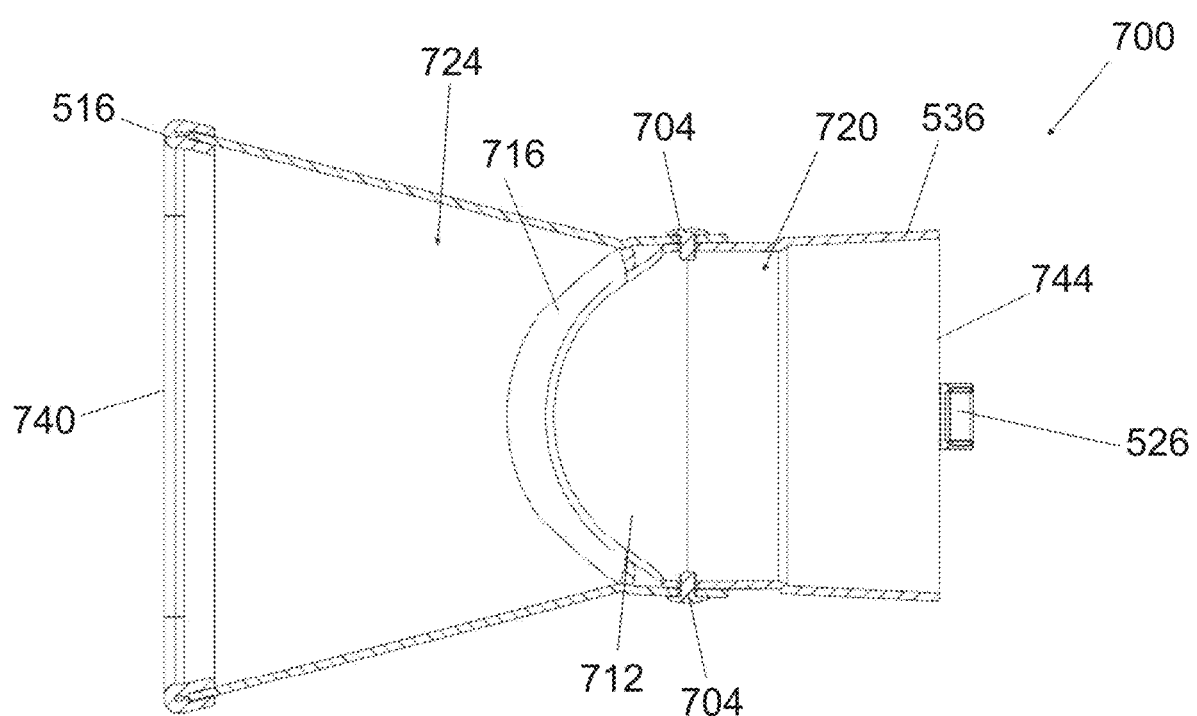
FIG. 16 is a cross section view of the articulating nozzle of FIG. 12.
Figure 17:
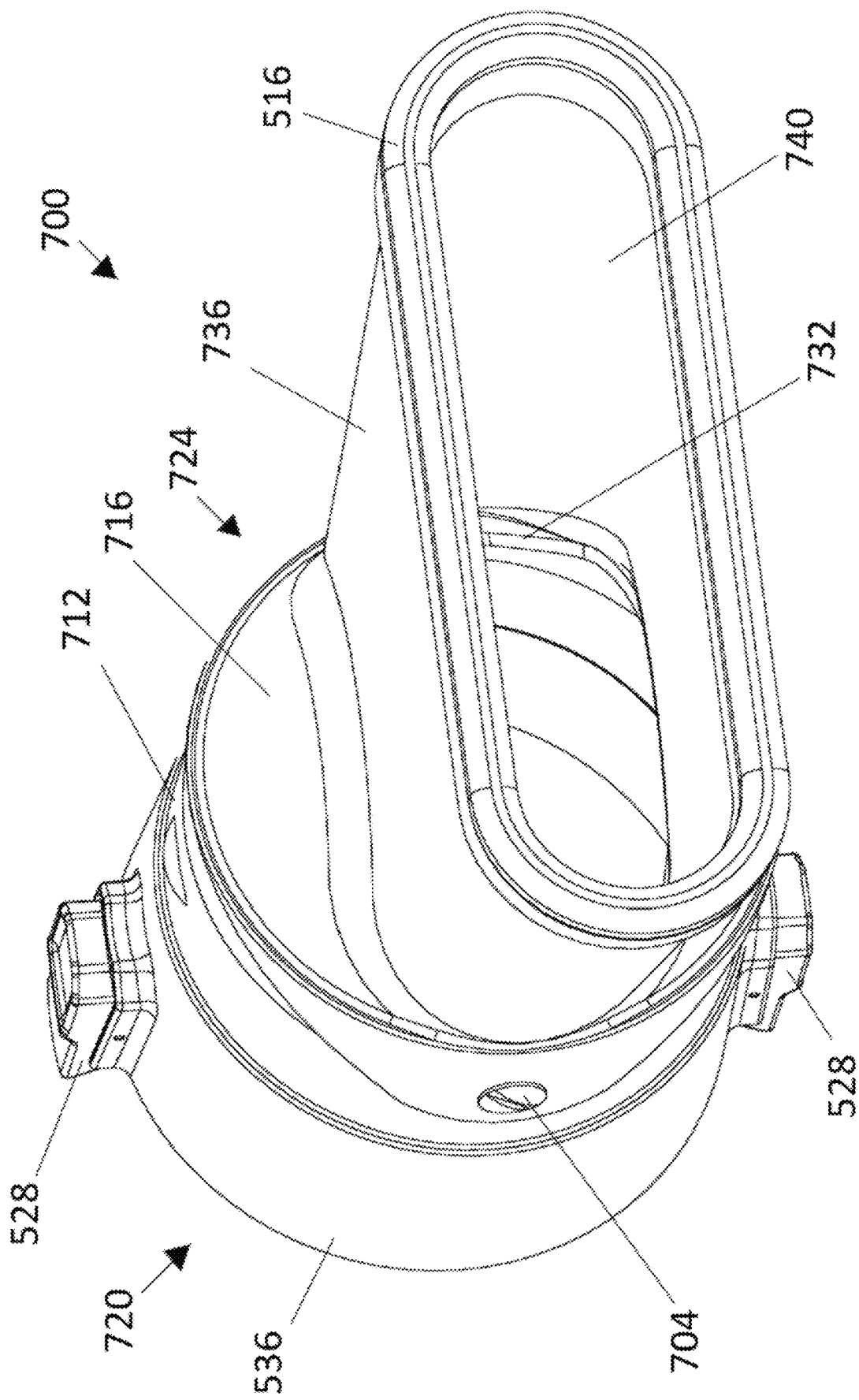
FIG. 17 is a front perspective view of the articulating nozzle of FIG. 12.

As shown in FIGS. 10 and 11, the conical nozzle (500) is designed to overlap the exterior of the adapter connection collar of the adapter section (200) and attach to the adapter connection collar (232) by at least one nozzle attachment clip (528). The one or more nozzle attachment clips (528) are configured to engage the clip attachment feature (236) of the adapter. Preferably, there are two nozzle attachment clips positioned on opposite sides of the collar. The nozzle attachment clip (528) has a clip release button (532) that when depressed disengages the clip attachment feature (236). It should be understood that, while shown as the embodiment described above, the nozzle attachment clip (528) may be located on the adapter section (200), the nozzle section (500), or both, and the clip attachment feature (236) would be oppositely located in order to mate with the nozzle attachment clip (528). The clip attachment feature (236) may be a raised edge, a recessed groove, a notch, or similar. In the shown configuration, the attachment feature is a recessed groove that is engaged by the clip tooth (544). Similar to the adapter attachment clip (216), the nozzle attachment clip (528) has a clip release button (532), a clip spring (548), a clip pin (552), a clip body (540), and a clip tooth (544). The clip spring provides a force on the underside of the clip release button (532). The clip body (540) connects the clip release button (532) to the clip tooth (544). The clip pin (552) is between the clip release button (532) and the clip tooth (544) and acts as a fulcrum for the spring force. The clip tooth (544) is slanted to compel the clip tooth to ride over the adapter connection collar (232) as the nozzle connection collar (536) is placed over the adapter connection collar (232). When the clip tooth (544) passes the clip attachment feature (236) the spring force forces the clip tooth (544) down and prevents the nozzle connection collar from being disconnected unless the clip release button is depressed.

The conical nozzle (500) has a conical nozzle inlet (508) in which air from the adapter section (200) enters the conical nozzle (500) and a conical nozzle outlet (512) where air exits the conical nozzle (500). The conical shape of the nozzle body (504) causes the airflow generated by the blower (100) to compress into a smaller area and increases the flowrate of the air exiting the nozzle outlet (512).

A safety tip (516) is preferably located proximate the conical nozzle outlet (512). The safety tip (516) is constructed of a relatively soft flexible material that will not scratch the surface of a vehicle being dried upon contact. The safety tip (516) may be composed of rubber, polymer, silicone, or other similar soft, flexible material. The safety tip (516) may be over-molded onto the rim of the nozzle outlet or may be frictionally engaged or attached with an adhesive.

Figure 3:
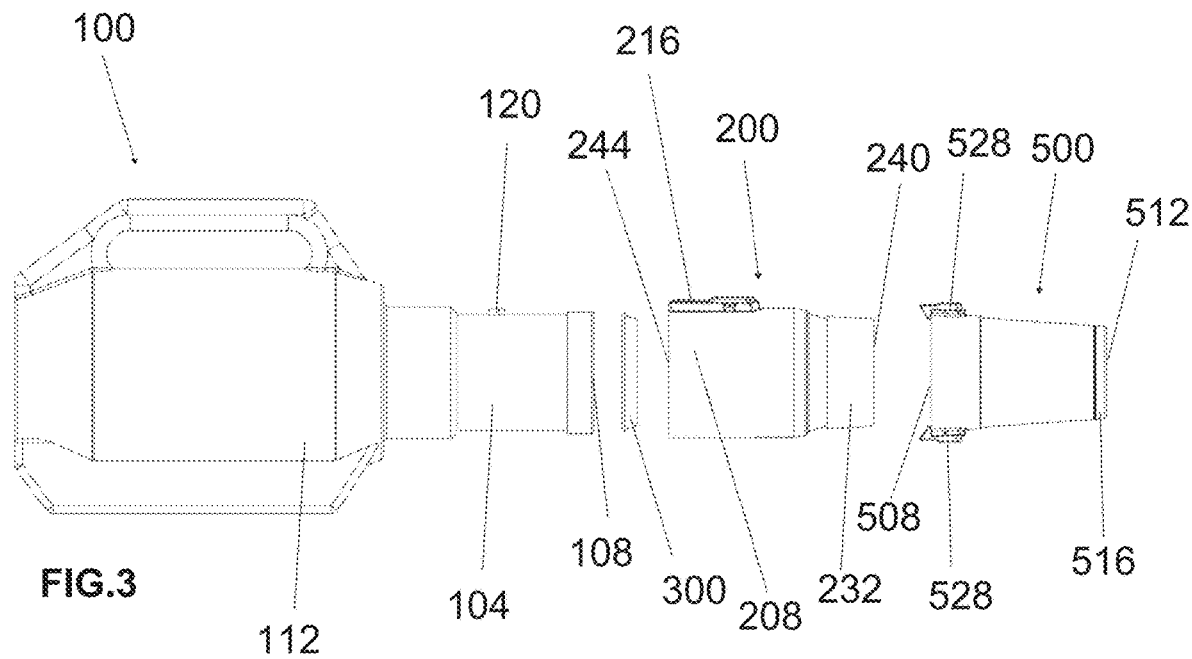
FIG. 3 is an exploded elevation view of the blower body with the drying assembly of FIG. 2, further including an inline filter.

In some embodiments, a screen or filter (300) is configured to be located in the air flow path between the blower and the end outlet of the dryer assembly. More particularly, the filter (300) may be located between the blower outlet (108) and the adapter section (200) as shown in FIG. 3, so that the adapter section (200) holds the filter (300) in place across the blower outlet (108). Alternatively, the filter may be located between any of the other component pieces of the various dryer assembly combinations described in the present disclosure. Further still, rather than being located between two components, any of the components may be configured with an opening or slot which would permit the filter to be positioned across the air flow path. The filter may be a mesh material which prevents debris, such as pieces of leaves or other particulate drawn into the blower motor which are of a size that could damage the surface of the vehicle, from being expelled through the blower outlet and damaging the surface of the vehicle. The filter may also be larger so that smaller debris may be passed through but larger debris, such as leaves and twigs are not able to be expelled from the blower outlet (108). In other embodiments, the filter (300) may be exchangeable to accommodate different types of filters. In still other embodiments, the filter may comprise a mesh or foam that is designed to be attached to the air intake of the blower (100) itself. This configuration allows for easy cleaning and removing of debris from the filter without requiring removal of the adapter section (200) from the blower (100).

FIGS. 12-17 show one embodiment of an articulating nozzle (700). The articulating nozzle (700) has a rotatable body section (720) and a pivoting nozzle section (724). A nozzle connection collar (536) is located proximate the inlet (744) of the rotatable body section (720) and includes at least one nozzle attachment clip (528). The rotatable body section (720) further includes a nozzle body outlet (728). In this embodiment, the nozzle body outlet (728) has a partially spherical outer surface (712) with an opening (732) allowing air to pass through. The pivoting nozzle section (724) is repositionable relative to the rotatable nozzle body (720). The pivoting nozzle section (724) includes a tapered body (736) with an outlet (740) and a partially spherical inlet section (716) that is configured to mate with the partially spherical outer surface (712) of the rotatable body section (720). The pivoting nozzle section (724) pivots about a connection between the rotatable nozzle body (720) and partially spherical inlet section (716) so as to direct the air flow from the opening (732) in a direction within 45 degrees of the blower axis (116). The rotatable nozzle body (720) permits the entire articulating nozzle (700) to rotate 360 degrees about the end of the adapter connection collar (232) of the preceding section.

The rotatable nozzle body (720) has pin holes (708) for accepting a pin that connects the rotatable body (720) to the pivoting nozzle section (724). The rotatable nozzle body (720) ends in a partially spherical outer surface (712) having an opening (732). The opening (732) is somewhat slot shaped to direct air flow from a cylindrical flow pattern to a more flat pattern corresponding to the articulating nozzle outlet (740). The overlap between the partially spherical outer surface (712) of the rotatable nozzle body (720) and the partially spherical inlet section (716) of the pivoting nozzle piece (724) prevents most of the air from escaping through the connection and forces the air out of the articulating nozzle outlet (740). The pivoting nozzle section (724) then transitions from the partially spherical inlet section (716) into the tapered body (736) which terminates in the articulating nozzle outlet (740) and optionally a safety tip (516). The cross section of the tapered body (736) where the tapered body connects to the partially spherical inlet section (716) is smaller than the cross section of the articulating nozzle outlet (740) such that the air passing through the tapered body is dispersed over a wider area.

The articulating nozzle (700) connects to an upstream section by having the nozzle connection collar (536) overlapping the adapter connection collar (232) and securing the connection with the use of at least one nozzle attachment clip (528) as discussed above. This connection allows the articulating nozzle (700) to rotate around the upstream section. This rotation allows the articulating nozzle (700) to have two degrees of motion—rotation of the articulating nozzle relative to the adapter connection collar (232) and a pivoting nozzle section (724).

Figure 18:
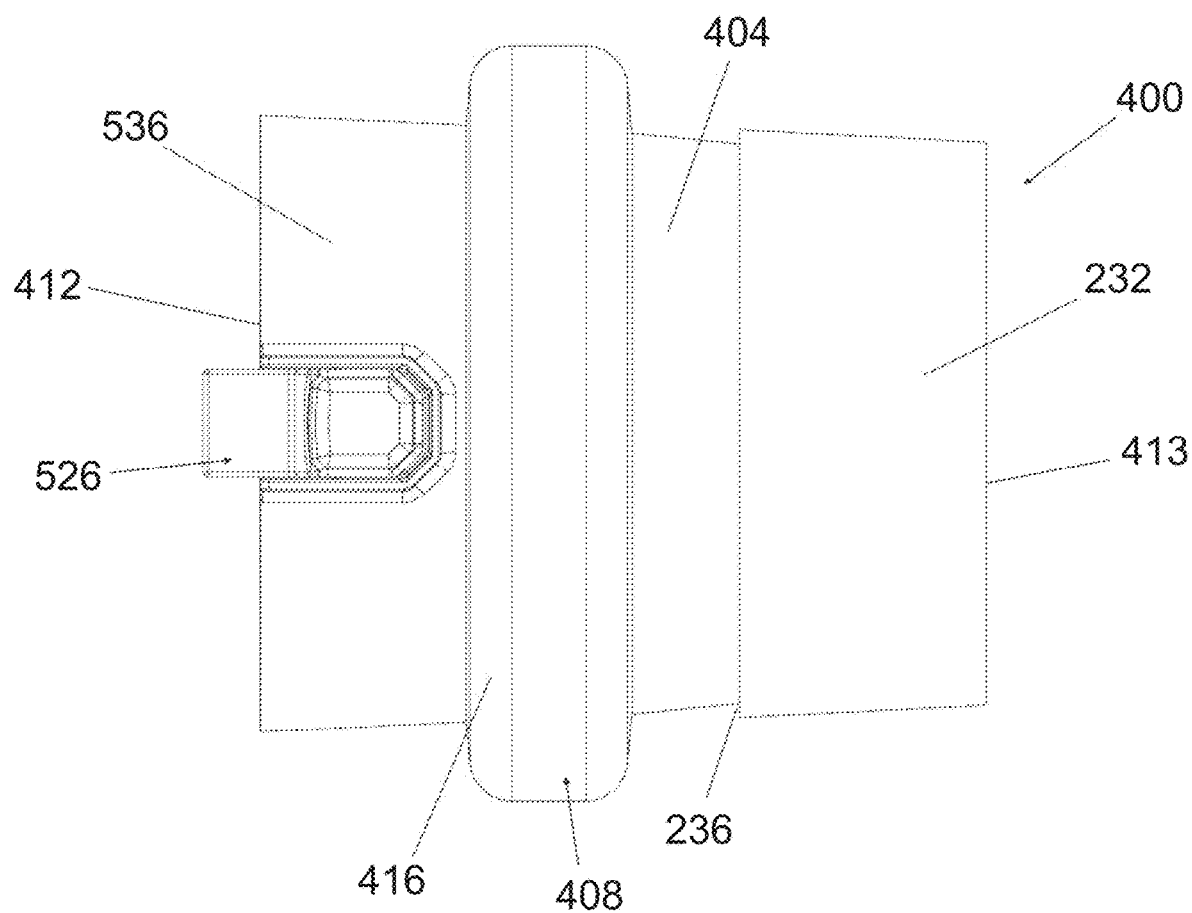
FIG. 18 is a top plan view of one embodiment of a weighted collar section.
Figure 19:
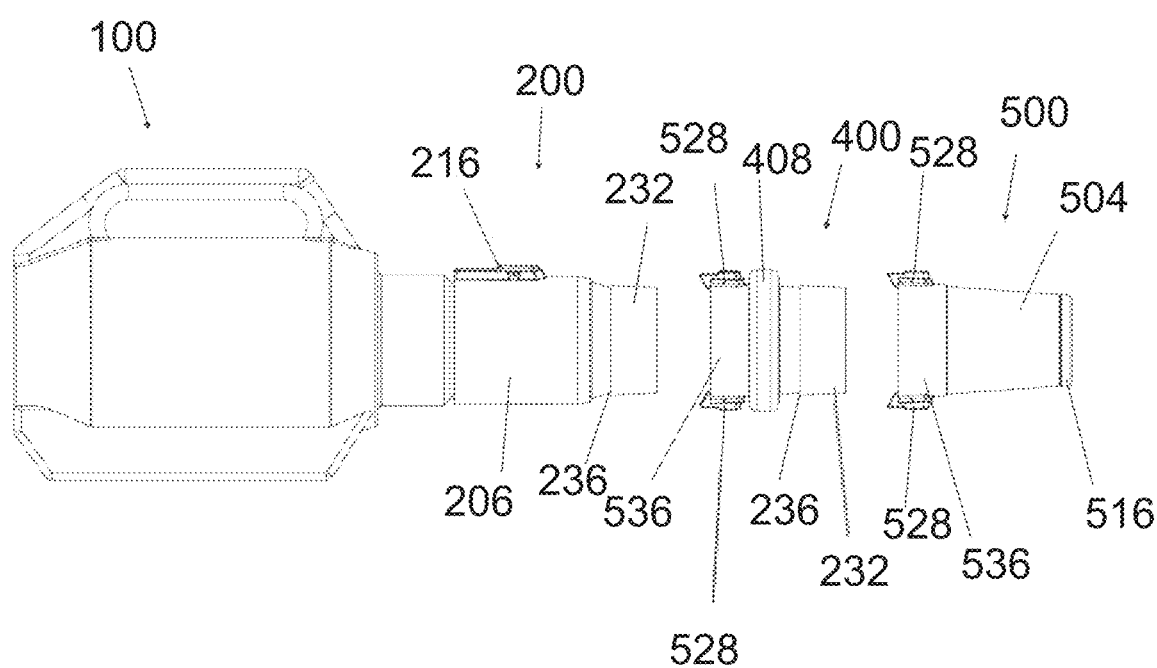
FIG. 19 is an exploded view of a second drying assembly having the adapter and conical nozzle of FIG. 2 with the weighted collar section of FIG. 18.

FIGS. 18 and 19 show one embodiment of a weighted section (400) that is configured to mate with the other components of the dryer kits described herein. The weighted section (400) is located between the adapter section (200) and a downstream section, being either a nozzle or extender tube section. The weighted section (400) is a tube and has an adapter connection collar (536) at the weighted section inlet (412), a body section (404), including a weighted ring (408), and a nozzle connection collar (232) at the weighted section outlet (413). The adapter connection collar (536) has at least one nozzle attachment clip (528) that is designed to engage a clip attachment feature (236) of a second component of the dryer kit. In one embodiment, the weighted ring (408) extends outwards from the weighted body (404) and is of a certain width. The weighted ring (408) is comprised of a ring exterior (416), preferably comprised of plastic, and is filled with sand, metal, plastic, water, rubber, or other suitably dense material. The nozzle connection collar (232) comprises a clip attachment feature (236).

The weighted section (400) is designed to counter the tendency of the blower to point upwards during use due to the weight of the blower. The force of the air leaving a nozzle can create rotation in the blower about the handle and cause it to point towards the sky rather than the vehicle surface. The plastic tubes, by themselves, do not provide much weight to counter the blower force. Therefore, the added weight provided by the weighted section (400) will prevent the blower from rotating during use and provide more control for the user. Additionally, the farther downstream the weighted section is from the blower, the more resistance will be provided. Thus, it is not required that the weighted section (400) be attached directly to the adapter section (200). Certain blowers may be more prone to raising than others, and so placing the weighted section (400) farther downstream may be advantageous.

FIG. 19 shows an exploded view of the adapter section (200) connected to the blower (100) and the weighted section (400) between the adapter section (200) and conical nozzle (500).

Figure 20:
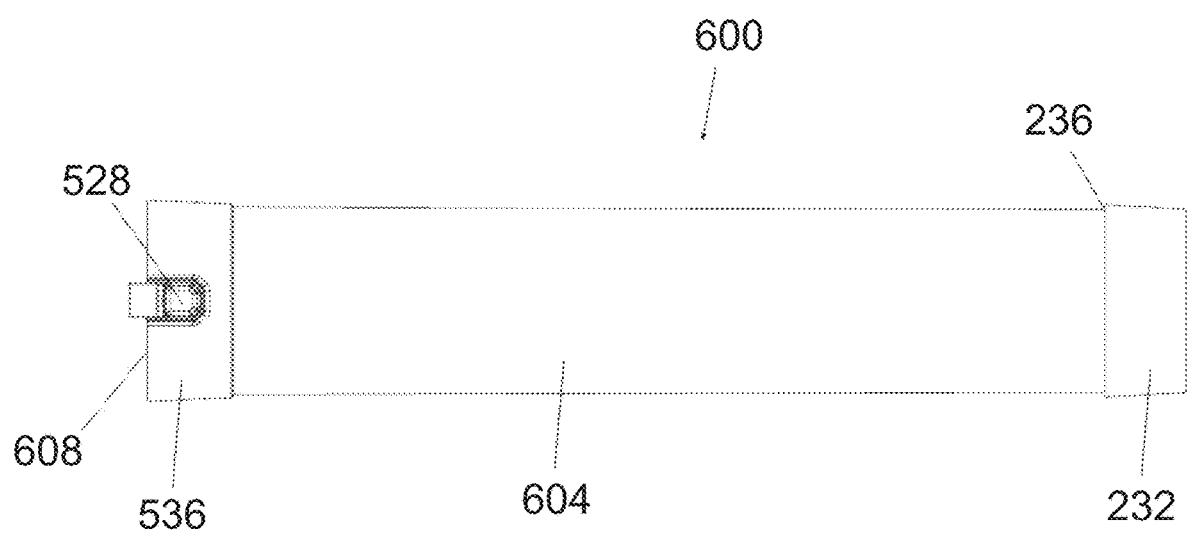
FIG. 20 is top plan view of one embodiment of an extender section.

FIG. 20 shows one embodiment of an extender section (600). The extender section (600) has an inlet (608), a nozzle connection collar (536) having a nozzle attachment clip (528), an extender tube (604), and an adapter connection collar (232) having a clip attachment feature (236). The nozzle connection collar (232) transitions into the extender tube (604). The extender tube (604) may be of any length within 6 to 36 inches. The extender tube (604) then ends at the adapter connection collar (232). The adapter connection collar (232) has a clip attachment feature (236) described above.

Figure 21:
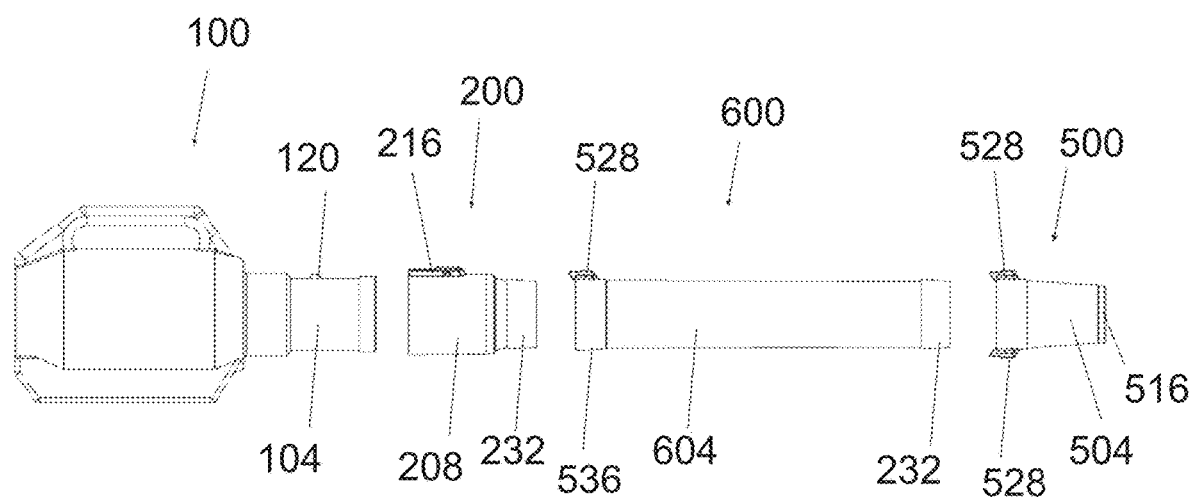
FIG. 21 is an exploded view of a third embodiment of a drying assembly having the adapter section and conical nozzle of FIG. 2 with the extender section of FIG. 20.

FIG. 21 shows an exploded view of an assembly of a blower (100), the adapter section (200), the extender section (600), and the conical nozzle (500).

Figure 22:
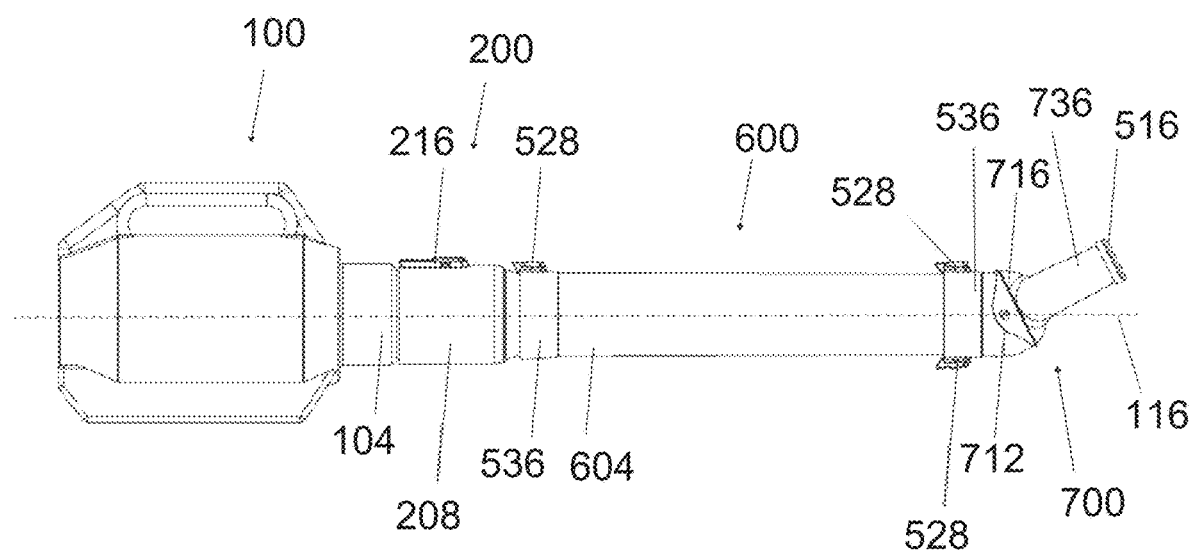
FIG. 22 is an elevation view of a fourth embodiment of a drying assembly with the adapter of FIG. 2, the extender of FIG. 20 and the articulating nozzle of FIG. 12, with the nozzle oriented upwards.

FIG. 22 shows one embodiment of an assembly of a blower (100), the adapter section (200), the extender section (600), and the articulating nozzle (700). The pivoting nozzle section (724) of the articulating nozzle (700) is shown pivoted at an angle in this configuration. The rotatable nozzle body (720) may rotate as much as 45 degrees in a direction off of the blower axis (116).

Figure 23:
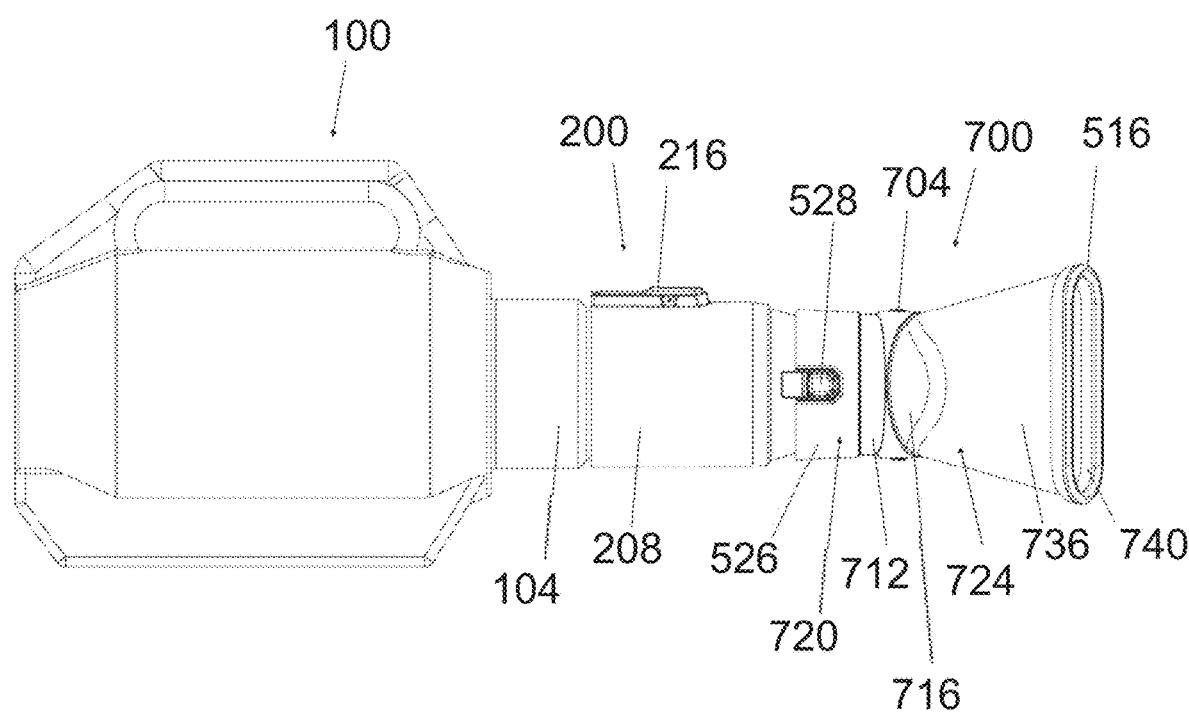
FIG. 23 is a side elevation view of a fifth embodiment of a drying assembly with the adapter of FIG. 2 and the articulating nozzle of FIG. 12.

As shown by FIG. 23, the nozzle connection collar (536) of the articulating nozzle (700) may be rotated about the adapter connection collar (232) of the previous section. This provides two degrees of movement for the articulating nozzle (700). It may rotate axially about the adapter connection collar (232) of the preceding or upstream section, and it may pivot so that the articulating nozzle outlet is facing up to 45 degrees off the blower axis (116) in opposite directions.

It is to be understood that any of the adapter connection collars (232) may be attached to any of the nozzle connection collars (536). Thus, while only some configurations are described and shown in the figures, any configuration that begins with the adapter section (200) and ends with either the conical nozzle (500) or the articulating nozzle (700) is possible. Thus, a configuration of the adapter section (200) connected to the extender section (600), which then connects to the weighted section (400) and ends in the conical nozzle (500) is possible. Alternatively, the adapter section could have the weighted section (400), then the extender section (600), then the articulating nozzle (700). Additionally, multiples of the weighted section (400) and extender section (600) are possible. Specifically, when drying larger vehicles, such as RV's and campers, it would be beneficial to combine multiple extender sections (600) together so that the blower's range is extended and a larger effective range is achieved.

It is therefore to be understood that while different embodiments are herein set forth and described, the above and other modifications and changes may be made in the construction and arrangement of elements as well as intended use of the apparatus without departing from the spirit and scope thereof. For example, the component parts may connect on the inside, not the outside, the clips may be different, the diameters may be different, the nozzle shape may be different, the length of the sections may be different, etc. The above configurations show the nozzle attachment clips going over the adapter connection collar; however, it is contemplated that the nozzle connection collars fit within the adapter connection collars. The above embodiments and configurations show the nozzle attachment clips contained on the nozzle connection collar and the clip attachment feature on the adapter connection collar; however, the clips may be found on the adapter connection collar and the clip attachment feature may be on the nozzle connection collar. Alternatively, it is contemplated that both the adapter connection collar and the nozzle connection collar have both nozzle attachment clips and clip attachment features. Additionally, the clip attachment feature shown in the above embodiments is a recessed groove in the collar; however, any suitable method for attaching the collar may be used. These include a ball and groove system, a raised feature similar to the one shown on the blower tube, magnets, a high friction surface to hold the connection together, a notch and groove, and other methods that would be obvious to one having skill in the art. While the figures show that there are two nozzle attachment clips, there may be one nozzle attachment clip or more than two nozzle attachment clips. Alternatively, there may be no nozzle attachment clips as described in certain embodiments such as those having a radial notch and groove attachment feature, a frictional attachment, or a biased attachment. There may also be a loop or ring attached to the each of the adapter section, the extender section and the nozzle sections to accommodate a shoulder strap. The strap would be connected to any of these loops and to the blower to facilitate carrying and use of the device. This loop or ring may consist of an arcuate extension extending radially out from each of these sections. Additionally, the airflow outlet of the nozzles may vary beyond what is shown in the accompanying drawings to provide a focused narrow airflow or a wider coverage area a would be appreciated by those of skill in the art upon reading the present disclosure. These nozzles would be useful for drying the tops of taller vehicles without requiring a ladder or platform.

Although the preferred embodiments according to the present disclosure have been described herein, the above description is merely illustrative. The embodiments disclosed do not limit the scope of the present disclosure. Further modification of the embodiments disclosed will occur to those skilled in the respective arts and all such modifications are deemed to be within the scope of the invention as defined by the appended claims.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments. The features of the embodiments may be combined in alternate embodiments other than those discussed above.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A vehicle drying assembly configured to mate with a tubular air outlet of a hand-held blower, comprising:
    a non-flexible tubular adapter section comprising:
        a first end and a second end spaced from the first end, the first end having an adapter section air inlet and the second end having an adapter section air outlet,
        the adapter section air inlet configured to fit over an exterior surface of the blower air outlet, and at least one adapter attachment clip configured to engage a first clip attachment feature of the blower;
        the second end having an adapter attachment collar having a second clip attachment feature, wherein a non-flexible air passageway exists from the blower outlet to the adapter section air outlet when the adapter section is attached to the hand-held blower;
    a nozzle section configured to attach to the second end of the adapter section, the nozzle section comprising:
        a nozzle inlet end and a nozzle outlet end;
        the nozzle inlet end having a nozzle attachment collar configured to fit over the adapter attachment collar and at least one nozzle attachment clip that engages the second clip attachment feature;
        the nozzle outlet end defining a nozzle opening and a soft safety tip disposed around the nozzle opening, and wherein the soft safety tip protects against damage to the vehicle in the event the soft safety tip contacts the vehicle during use.

2. The vehicle drying assembly of claim 1 wherein the adapter section air inlet has a substantially cylindrical inner surface and when the adapter section is attached to the hand-held blower the adapter section air inlet overlaps the hand-held blower outlet by a length between 2.5 and 5.5 inches.

3. The vehicle drying assembly of claim 1, further comprising:
    a weighted section located between the adapter section and the nozzle section, the weighted section having a tubular body, a weighted ring, and an inlet and an outlet, the weighted ring positioned between the inlet and outlet.

4. The vehicle drying assembly of claim 3, wherein the inlet of the weighted section comprises an adapter attachment collar and an adapter attachment clip, and the outlet comprises a nozzle connection collar and a third clip attachment feature.

5. The vehicle drying assembly of claim 3, wherein the weighted ring contains one of, sand, water, metal, rubber, or plastic.

6. The vehicle drying assembly of claim 1, further comprising, a tubular extension section configured to be placed between the adapter attachment collar and the nozzle attachment collar, the tubular extension section comprising an extender inlet, an extender outlet spaced from the extender inlet and an extender body positioned between the extender inlet and extender outlet, the extender inlet having a first extender attachment collar and a first extender attachment clip configured to engage the second clip attachment feature, the extender outlet having a second extender attachment collar and a fourth clip attachment feature.

7. The vehicle drying assembly of claim 1, wherein the nozzle section comprises a conical shape and the inlet end is larger than the outlet end.

8. An air directing assembly configured to attach to a handheld blower having an outlet tube, comprising:
    an adapter section comprising an adapter inlet, a hollow adapter body, and an adapter outlet, the adapter outlet being in fluid communication with the adapter inlet through the adapter body, the adapter inlet configured to fit over the blower outlet tube and having a first attachment clip configured to engage a first attachment feature on the blower outlet tube, an adapter connection collar surrounding the adapter outlet, and a second clip attachment feature connected to the adapter connection collar; and
    an articulating nozzle section having a hollow nozzle inlet portion and a hollow nozzle outlet portion, the nozzle inlet portion having a first end and a second end, a nozzle attachment clip located proximate the first end, a nozzle connection collar located proximate the first end and surrounding an air inlet port, and a first partially spherical member located at the second end, the first partially spherical member having an aperture in fluid communication with the air inlet port, the nozzle connection collar configured to fit over the adapter connection collar with the nozzle attachment clip engaging the second clip attachment feature of the adapter connection collar, the hollow nozzle outlet portion having a first end and a second end, a second partially spherical member having a second aperture located at the first end, an air outlet port located at the second end and in fluid communication with the second aperture, the hollow nozzle outlet portion pivotally attached to the hollow nozzle inlet portion and movable between a first position and a second position, wherein the second partially spherical member slidably engages the first partially spherical member when the hollow nozzle outlet portion moves relative to the hollow nozzle inlet portion and wherein the first aperture and the second aperture remain in fluid communication when the hollow nozzle outlet portion moves between the first position and the second position.

9. The air directing assembly of claim 8, wherein the articulating nozzle section is rotatable around the adapter connection collar so that the articulating nozzle section has two degrees of motion.

10. The air directing assembly of claim 8 further comprising, a removable inline filter positioned between the blower outlet tube and the adapter connection collar and comprising a mesh of fibers spaced approximately 0.1" apart.

11. The air directing assembly of claim 8 further comprising, a weighted section that is configured to be placed between the adapter section and the articulating nozzle section, the weighted section having a tubular body, an inlet, and an outlet, an attachment collar surrounding the inlet, an attachment clip disposed on the attachment collar, a sealing collar surrounding the outlet and a clip attachment feature disposed on the sealing collar, and a weighted portion positioned between the inlet and outlet.

12. The air directing assembly of claim 8 further comprising a tubular extension section configured to be placed between the adapter connection collar and the nozzle connection collar, the extender section comprising an extender inlet, an extender body, and an extender outlet, an attachment collar surrounding the extender inlet and an attachment clip associated with the attachment collar and configured to engage the second clip attachment feature of the adapter section, and an attachment collar surrounding the extender outlet and having a clip attachment feature.

13. The air directing assembly of claim 8 wherein the air outlet port has a perimeter edge, further comprising a flexible safety tip surrounding the perimeter edge, the safety tip comprising one or more of a rubber material, a polymer material, a silicone material, or a soft plastic.

14. An airflow control kit for use with a hand-held blower for drying a vehicle, comprising:
a tubular adapter section configured to fit over a blower outlet tube of an existing handheld blower, the tubular adapter section having an inlet end and an outlet end in fluid communication;
a nozzle section having a nozzle body, a first end and a second end spaced from the first end, a nozzle inlet disposed at the first end and a nozzle outlet disposed at the second end, the nozzle inlet having a size different than the nozzle outlet, the nozzle inlet in fluid communication with the nozzle outlet through the nozzle body;
a hollow weighted section disposed between the adapter section and the nozzle section, the weighted section having an inlet, and an outlet and a weighted portion positioned between the inlet and outlet; and
a filter positioned across the flow of air moving through the kit.

15. A vehicle drying assembly configured to mate with a tubular outlet of a hand-held blower having a blower outlet, comprising:
a tubular adapter section comprising:
a first end and a second end spaced from the first end, the first end having an air inlet and the second end having an air outlet;
the first end having an adapter inlet configured to fit over the blower outlet, and at least one adapter attachment clip configured to engage a first clip attachment feature of the blower;
the second end having an adapter attachment collar having a second clip attachment feature;
a nozzle section configured to attach to the adapter section, the nozzle section comprising:
a nozzle inlet end having a nozzle inlet and a nozzle attachment collar located proximate the nozzle inlet configured to fit over the adapter attachment collar and at least one nozzle attachment clip that engages the second clip attachment feature;
a nozzle outlet end having a nozzle outlet defining the distal end of the drying assembly and having a safety tip disposed proximate the nozzle outlet;
a first nozzle subsection and a second nozzle subsection, wherein the first nozzle subsection has a first end and a second end, the first end including the nozzle inlet and the second end comprising a first partial spherical section having a first aperture;
the second nozzle subsection has a first end and a second end, the second end including the nozzle outlet and the first end comprising a second partial spherical section having a second aperture, the second partial spherical section configured to interface with the first partial spherical section and move between a first position and a second position relative to the first partial spherical section, and the first aperture and second aperture configured in fluid communication when second spherical section moves between the first position and the second position.

16. A vehicle drying assembly configured to mate with a tubular outlet of a hand-held blower having a blower outlet, comprising:
a tubular adapter section comprising:
a first end and a second end spaced from the first end, the first end having an air inlet and the second end having an air outlet;
the first end having an adapter inlet configured to fit over the blower outlet, and at least one adapter attachment clip configured to engage a first clip attachment feature of the blower;
the second end having an adapter attachment collar having a second clip attachment feature that extends 360 degrees around the adapter attachment collar;
a nozzle section configured to attach to the adapter section, the nozzle section comprising:
a nozzle inlet end and a nozzle outlet end;
the nozzle inlet end having a nozzle attachment collar configured to fit over the adapter attachment collar and at least one nozzle attachment clip that is biased to automatically lock to a portion of the second clip attachment feature when the nozzle section is joined to the tubular adapter section;
the nozzle outlet end defining the distal end of the drying assembly and having a safety tip disposed proximate the nozzle outlet.

17. The vehicle drying assembly of claim 16, wherein the second clip attachment feature comprises one of a raised shoulder and a recessed groove.

18. The vehicle drying assembly of claim 17, wherein the nozzle attachment clip comprises a tooth that engages the second clip attachment feature, the tooth movable between a first position and a second position, and a biasing member that biases the tooth to the first position.

19. The vehicle drying assembly of claim 16, further comprising, a tubular extension section configured to be placed between the adapter attachment collar and the nozzle attachment collar, the tubular extension section comprising an extension inlet, an extension outlet spaced from the extension inlet and an extension body positioned between the extension inlet and the extension outlet, the extension inlet having a first extension attachment collar and a first extension attachment clip configured to engage the second clip attachment feature, the extension outlet having a second extension attachment collar and a fourth clip attachment feature that extends 360 degrees around the tubular extension section.

20. The vehicle drying assembly of claim 1, wherein the soft safety tip comprises a polymer.

\* \* \* \* \*

UNITED STATES PATENT AND TRADEMARK OFFICE
CERTIFICATE OF CORRECTION

PATENT NO. : 11,919,488 B2
APPLICATION NO. : 16/945413
DATED : March 5, 2024
INVENTOR(S) : David L. Beaver, IV It is certified that error appears in the above-identified patent and that said Letters Patent is hereby corrected as shown below:

In the Specification

At Column 1, Line 22, please replace the word "overtime" with the words "over time"

At Column 5, Line 56, please replace the word "Nozzle" with the word "Rotatable"

At Column 6, Line 15, please replace the word and reference number "Portion (124)" with the words and reference number "Adapter body (208)"

At Column 6, Line 16, please insert the words and reference number --overlapping portion (124)-- between the words "blower tube" and "by a sufficient distance"

At Column 6, Line 33, please insert the word --body-- between the word "adapter" and reference number "(208)"

At Column 6, Line 35, please insert the word --body-- between the word "adapter" and reference number "(208)"

At Column 8, Line 24, please delete the word "section" between the word "body" and reference number "(720)"

At Column 8, Line 26, please delete the word "section" between the word "body" and reference number "(720)"

At Column 8, Line 28, please delete the word "section" between the word "body" and reference number "(720)"

At Column 8, Line 28, please replace the word "nozzle" with the word "rotatable"

Signed and Sealed this
Thirtieth Day of April, 2024

Katherine Kelly Vidal
*Director of the United States Patent and Trademark Office*

CERTIFICATE OF CORRECTION (continued)
U.S. Pat. No. 11,919,488 B2

At Column 8, Line 29, please replace the word "nozzle" with the word "rotatable"

At Column 8, Line 32, please delete the word "nozzle" between the words "rotatable" and "body"

At Column 8, Line 36, please delete the word "section" between the word "body" and reference number "(720)"

At Column 8, Line 38, please delete the word "nozzle" between the words "rotatable" and "body"

At Column 8, Line 45, please delete the word "nozzle" between the words "rotatable" and "body"

At Column 8, Line 47, please delete the word "nozzle" between the words "rotatable" and "body"

At Column 8, Line 53, please delete the word "nozzle" between the words "rotatable" and "body"

At Column 10, Line 1, please delete the word "nozzle" between the words "rotatable" and "body"